United States Patent
Herzog et al.

(10) Patent No.: US 11,911,957 B2
(45) Date of Patent: Feb. 27, 2024

(54) METHODS FOR DAMAGE DETECTION DURING ADDITIVE MANUFACTURING OF AT LEAST ONE THREE-DIMENSIONAL OBJECT USING DETECTED LAYER INFORMATION AND SMOOTHNESS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Fabian Zeulner, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 0 days.

(21) Appl. No.: 15/571,796

(22) PCT Filed: Jun. 21, 2016

(86) PCT No.: PCT/EP2016/064237
§ 371 (c)(1),
(2) Date: Nov. 3, 2017

(87) PCT Pub. No.: WO2016/207123
PCT Pub. Date: Dec. 29, 2016

(65) Prior Publication Data
US 2018/0215103 A1    Aug. 2, 2018

(30) Foreign Application Priority Data
Jun. 25, 2015   (DE) .......................... 102015110264.1

(51) Int. Cl.
*B29C 64/393*   (2017.01)
*B33Y 10/00*    (2015.01)
(Continued)

(52) U.S. Cl.
CPC ............ *B29C 64/153* (2017.08); *B22F 10/28* (2021.01); *B22F 10/36* (2021.01); *B22F 10/37* (2021.01);
(Continued)

(58) Field of Classification Search
CPC ..... B29C 64/393; B29C 64/35; B29C 64/153; B33Y 50/02; B33Y 30/00; B33Y 40/00;
(Continued)

(56) References Cited

U.S. PATENT DOCUMENTS

| 4,938,274 A | * | 7/1990 | Iwamoto | ............. B22D 17/145 164/4.1 |
| 5,045,668 A | * | 9/1991 | Neiheisel | ............. B23K 26/032 219/121.83 |

(Continued)

FOREIGN PATENT DOCUMENTS

| CA | 2497761 A1 | * | 3/2004 | ............. C23C 24/10 |
| CA | 2900297 A1 | * | 9/2014 | ........... B23K 26/342 |

(Continued)

OTHER PUBLICATIONS

Line Scan NPL (https://www.vision-doctor.com/en/line-scan-cameras/line-scan-camera-basics.html) (Year: 2021).*

(Continued)

*Primary Examiner* — Francisco W Tschen
*Assistant Examiner* — Guy F Mongelli
(74) *Attorney, Agent, or Firm* — Dority & Manning, P.A.

(57) ABSTRACT

An apparatus (1) for the additive manufacturing of at least one three-dimensional object (2) by selectively compacting layer by layer at least one compactible building material (3) by means of at least one energy beam (5) generated by at least one radiation generating device (4), comprising at least one radiation generating device (4) for generating at least one energy beam (5) for compacting at least one compactible (Continued)

Figure 1:
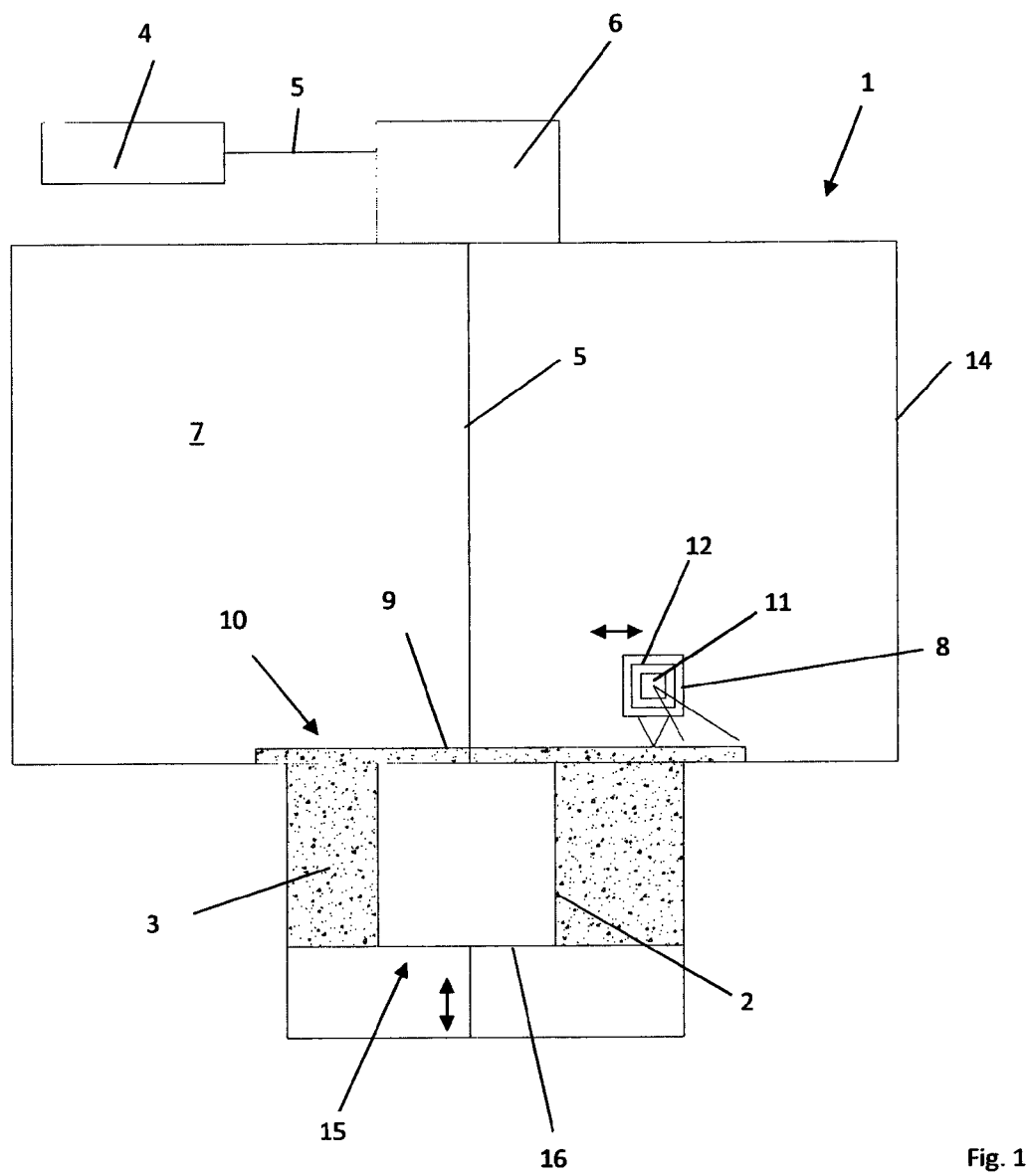

building material (3), at least one coating device (8) for carrying out at least one coating operation to apply a defined building material layer (9) of at least one compactible building material (3) to a building plane (10) or to a building material layer (9) of at least one compactible building material (3) that has previously been applied in the course of carrying out a previous coating operation, and also at least one recording device (11) for recording layer information describing.

14 Claims, 3 Drawing Sheets

(51) Int. Cl.
| | | |
|---|---|---|
| B33Y 40/00 | (2020.01) | |
| B22F 10/20 | (2021.01) | |
| B33Y 30/00 | (2015.01) | |
| B33Y 50/02 | (2015.01) | |
| B23K 26/342 | (2014.01) | |
| B29C 64/153 | (2017.01) | |
| B29C 64/35 | (2017.01) | |
| B23K 26/00 | (2014.01) | |
| B23K 26/03 | (2006.01) | |
| B23K 26/16 | (2006.01) | |
| B22F 10/30 | (2021.01) | |
| B22F 10/28 | (2021.01) | |
| B22F 12/00 | (2021.01) | |
| B22F 12/60 | (2021.01) | |
| B22F 12/67 | (2021.01) | |
| B22F 12/90 | (2021.01) | |
| B22F 10/36 | (2021.01) | |
| B22F 10/37 | (2021.01) | |
| B22F 12/49 | (2021.01) | |

(52) U.S. Cl.
CPC ............ *B22F 12/222* (2021.01); *B22F 12/60* (2021.01); *B22F 12/67* (2021.01); *B22F 12/90* (2021.01); *B23K 26/0093* (2013.01); *B23K 26/032* (2013.01); *B23K 26/16* (2013.01); *B23K 26/342* (2015.10); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12); *B22F 12/49* (2021.01); *Y02P 10/25* (2015.11)

(58) Field of Classification Search
CPC .. B33Y 10/00; B23K 26/0093; B23K 26/032; B23K 26/16; B23K 26/342; B22F 3/1055; B22F 2003/1057; Y02P 10/295
See application file for complete search history.

(56) References Cited

U.S. PATENT DOCUMENTS

| | | | | |
|---|---|---|---|---|
| 5,632,083 | A * | 5/1997 | Tada | B23K 26/032 |
| | | | | 29/827 |
| 6,054,192 | A | 4/2000 | Otsuka et al. | |
| 6,794,224 | B2 * | 9/2004 | Akram | H01L 23/3114 |
| | | | | 438/125 |
| 8,573,958 | B2 * | 11/2013 | Hangaard | B29C 64/129 |
| | | | | 425/174.4 |
| 9,358,729 | B2 | 6/2016 | Hofacker et al. | |
| 9,878,494 | B2 | 1/2018 | Hartmann et al. | |
| 9,952,236 | B2 | 4/2018 | Satzger et al. | |
| 10,493,562 | B2 | 12/2019 | Dimter et al. | |
| 2001/0004480 | A1 * | 6/2001 | Mueller | B23K 26/18 |
| | | | | 427/554 |
| 2001/0008231 | A1 * | 7/2001 | Britnell | B23K 26/04 |
| | | | | 219/121.61 |
| 2001/0048182 | A1 * | 12/2001 | Caretta | B29D 30/0606 |
| | | | | 264/337 |
| 2002/0060379 | A1 * | 5/2002 | Wei | B29C 45/7646 |
| | | | | 264/443 |
| 2004/0026807 | A1 | 2/2004 | Andersson et al. | |
| 2004/0173946 | A1 | 9/2004 | Pfeifer et al. | |
| 2004/0265516 | A1 * | 12/2004 | Schulz | B41M 5/52 |
| | | | | 428/32.34 |
| 2005/0184032 | A1 * | 8/2005 | Yamazaki | B23K 26/0604 |
| | | | | 219/121.6 |
| 2005/0263505 | A1 * | 12/2005 | Yamazaki | B23K 26/0093 |
| | | | | 219/121.78 |
| 2006/0022379 | A1 * | 2/2006 | Wicker | B33Y 30/00 |
| | | | | 264/255 |
| 2006/0208396 | A1 * | 9/2006 | Abe | B22F 3/1055 |
| | | | | 264/497 |
| 2006/0213879 | A1 * | 9/2006 | Baudron | B23K 26/032 |
| | | | | 219/121.68 |
| 2009/0102098 | A1 * | 4/2009 | Adams | B22F 10/00 |
| | | | | 264/401 |
| 2009/0120915 | A1 * | 5/2009 | Tagawa | B23K 26/032 |
| | | | | 219/121.62 |
| 2009/0152771 | A1 * | 6/2009 | Philippi | B33Y 10/00 |
| | | | | 264/410 |
| 2010/0006228 | A1 | 1/2010 | Abe et al. | |
| 2010/0044547 | A1 | 2/2010 | Higashi et al. | |
| 2010/0102487 | A1 * | 4/2010 | Schumaker | G03F 9/7049 |
| | | | | 264/408 |
| 2010/0176539 | A1 | 7/2010 | Higashi et al. | |
| 2010/0314362 | A1 * | 12/2010 | Albrecht | B23K 9/0953 |
| | | | | 219/121.63 |
| 2011/0061591 | A1 | 3/2011 | Stecker | |
| 2011/0165340 | A1 * | 7/2011 | Baumann | B22F 3/1055 |
| | | | | 427/532 |
| 2011/0265893 | A1 * | 11/2011 | Scott | B01D 46/0058 |
| | | | | 137/544 |
| 2011/0313560 | A1 * | 12/2011 | Hangaard | B29C 64/129 |
| | | | | 700/120 |
| 2012/0244682 | A1 * | 9/2012 | Tanaka | B23K 26/0093 |
| | | | | 438/464 |
| 2012/0251829 | A1 * | 10/2012 | Xu | B29C 64/135 |
| | | | | 428/414 |
| 2013/0000553 | A1 * | 1/2013 | Hoechsmann | B29C 64/124 |
| | | | | 118/708 |
| 2013/0026676 | A1 * | 1/2013 | Tresse | B05B 16/90 |
| | | | | 264/241 |
| 2013/0234355 | A1 * | 9/2013 | Hartmann | B22F 3/1055 |
| | | | | 264/113 |
| 2014/0159266 | A1 * | 6/2014 | Bamberg | B22F 3/1055 |
| | | | | 264/40.1 |
| 2014/0263209 | A1 * | 9/2014 | Burris | B23K 26/082 |
| | | | | 219/121.62 |
| 2014/0265047 | A1 | 9/2014 | Burris et al. | |
| 2014/0265048 | A1 * | 9/2014 | Burris | B23K 26/0821 |
| | | | | 264/497 |
| 2014/0308153 | A1 | 10/2014 | Ljungblad | |
| 2014/0355173 | A1 * | 12/2014 | Odle | C08J 5/18 |
| | | | | 361/301.5 |
| 2015/0017054 | A1 * | 1/2015 | Jakimov | B23K 26/08 |
| | | | | 419/53 |
| 2015/0038062 | A1 * | 2/2015 | Umeda | H01L 21/67219 |
| | | | | 451/70 |
| 2015/0042018 | A1 * | 2/2015 | Gunther | B22F 3/1055 |
| | | | | 264/461 |
| 2015/0060422 | A1 * | 3/2015 | Liebl | B23K 26/08 |
| | | | | 219/121.78 |
| 2015/0076125 | A1 * | 3/2015 | Toyosawa | B23K 26/00 |
| | | | | 219/121.73 |
| 2015/0079231 | A1 | 3/2015 | Shi et al. | |
| 2015/0165683 | A1 * | 6/2015 | Cheverton | B29C 64/112 |
| | | | | 382/141 |
| 2015/0165694 | A1 * | 6/2015 | Lee | B29C 64/112 |
| | | | | 425/225 |

(56) References Cited

U.S. PATENT DOCUMENTS

| | | | | |
|---|---|---|---|---|
| 2015/0174695 A1* | 6/2015 | Elfstroem | .......... | B23K 15/0086 |
| | | | | 219/121.14 |
| 2015/0174828 A1* | 6/2015 | Creuzer | ................ | B29C 64/386 |
| | | | | 264/40.1 |
| 2015/0177512 A1* | 6/2015 | Hayakawa | ................ | B60S 1/56 |
| | | | | 348/148 |
| 2015/0273767 A1* | 10/2015 | Batchelder | ............ | B29C 64/135 |
| | | | | 264/401 |
| 2015/0367448 A1* | 12/2015 | Buller | ..................... | B22F 10/40 |
| | | | | 219/74 |
| 2016/0129639 A1* | 5/2016 | Huang | .................. | B29C 64/209 |
| | | | | 425/150 |
| 2016/0179064 A1* | 6/2016 | Arthur | .................. | B29C 64/393 |
| | | | | 700/98 |
| 2016/0214319 A1 | 7/2016 | Wiel et al. | | |
| 2016/0221262 A1* | 8/2016 | Das | ....................... | B29C 64/393 |
| 2016/0349215 A1* | 12/2016 | Todorov | ................ | B29C 64/386 |
| 2017/0120337 A1* | 5/2017 | Kanko | ............... | G01B 9/02083 |
| 2018/0009170 A1* | 1/2018 | Cortes | .................... | B33Y 50/02 |

FOREIGN PATENT DOCUMENTS

| | | |
|---|---|---|
| CN | 103949636 A | 7/2014 |
| CN | 104023948 A | 9/2014 |
| CN | 107214950 B | 8/2018 |
| DE | 102007040755 A1 | 3/2009 |
| DE | 102010052206 A1 | 5/2012 |
| DE | 102010052206 B4 | 5/2012 |
| DE | 102011009624 A1 | 8/2012 |
| DE | 102011009624 A1 | 8/2012 |
| EP | 3323534 B1 | 5/2018 |
| FR | 2984778 A1 * | 6/2013 .............. B22F 10/20 |
| JP | 2001/34582 A | 12/2001 |
| JP | 2003/531034 A | 10/2003 |
| JP | 2009/078558 A | 4/2009 |
| JP | 2009/107153 A | 5/2009 |
| JP | 2010/520091 A | 6/2010 |
| JP | 2010132960 A | 6/2010 |
| JP | H10217336 A | 6/2010 |
| JP | 4846958 B2 | 12/2011 |
| JP | 2016516886 A | 6/2016 |
| JP | 2016533432 A | 10/2016 |
| WO | 2014074947 A2 | 5/2014 |
| WO | WO2014/074947 A2 | 5/2014 |
| WO | 2014095200 A1 | 6/2014 |
| WO | WO2014/095200 A1 | 6/2014 |

OTHER PUBLICATIONS

EP Office Action 16731125.7 dated Oct. 22, 2018.
Machine Translated Japanese Office Action Corresponding to Application No. 2017558693 dated Dec. 6, 2018.
Machine Translated Chinese Office Action Corresponding to Application No. 201680024394 dated Feb. 2, 2019.
European Search Report Corresponding to U.S. Appl. No. 18/186,338 dated Oct. 16, 2018.
European Office Action Corresponding to U.S. Appl. No. 16/731,125 dated Jun. 24, 2020.
Machine Translated Japanese Search Report Corresponding to Application No. 20192301010 dated Dec. 9, 2020.

* cited by examiner

METHODS FOR DAMAGE DETECTION DURING ADDITIVE MANUFACTURING OF AT LEAST ONE THREE-DIMENSIONAL OBJECT USING DETECTED LAYER INFORMATION AND SMOOTHNESS

CROSS-REFERENCE TO RELATED APPLICATIONS

This application is a United States national stage entry of an International Application serial no. PCT/EP2016/064237 filed Jun. 21, 2016 which claims priority to German Patent Application serial no. 10 2015 110 264.1 filed Jun. 25, 2015. The contents of these applications are incorporated herein by reference in their entirety as if set forth verbatim.

The invention relates to an apparatus for the additive manufacturing of at least one three-dimensional object by selective consolidation of layers of at least one consolidatable construction material by means of at least one energy beam generated by at least one radiation-generating unit.

Apparatuses of this kind are fundamentally known for the additive manufacturing of three-dimensional objects of different cross-sectional geometries. Three-dimensional objects to be produced are built up successively by means of an energy beam generated by a radiation-generating unit, by selective consolidation of layers of a consolidatable construction material in regions corresponding to corresponding cross-sectional regions of the objects to be produced.

Corresponding apparatuses comprise, inter alia, a beam-generating unit for generating an energy beam for the consolidation of a consolidatable construction material, and a coating unit for carrying out a coating process for the application of a defined construction material layer of the consolidatable construction material to a construction plane or to a construction material layer previously applied in the context of carrying out a previous coating process.

For precise selective consolidation of the consolidatable construction material, which is an essential prerequisite for the production of high-quality three-dimensional objects, high quality of the construction material layers applied by means of the coating unit is of considerable importance.

To date, the quality of respective construction material layers applied by means of corresponding coating units can only be detected after the completion of a coating process. This is time-consuming and, to this extent, worthy of improvement.

It is the underlying object of the invention to specify an apparatus for the additive manufacturing of at least one three-dimensional object, which apparatus is improved in comparison.

The object is achieved by an apparatus as claimed in claim 1 and a method as claimed in claim 14. The respective dependent claims relate to expedient embodiments of the apparatus or of the method.

The apparatus described herein is used for the additive manufacturing of at least one three-dimensional object by selective consolidation of layers of at least one consolidatable construction material by means of at least one energy beam generated by at least one radiation-generating unit. A consolidatable construction material in corresponding fashion is typically powdery or powdered. Thus, the construction material can be a metal powder (mixture) that can be correspondingly consolidated and/or a plastic powder (mixture) that can be correspondingly consolidated, for example.

A corresponding radiation-generating unit can be a laser-generating unit for generating a laser beam, or laser for short, or the radiation-generating unit can comprise at least one such laser-generating unit. In this case, the apparatus can be designed, for example, as a selective laser sintering apparatus, or SLS apparatus for short, for carrying out selective laser sintering processes, or as a selective laser melting apparatus, or SLM apparatus for short, for carrying out selective laser melting processes. Of course, a corresponding radiation-generating unit can also be a particle-generating unit for generating particle radiation, or the radiation-generating unit can comprise at least one such unit.

The apparatus comprises, in a manner known per se, at least one coating unit for carrying out at least one coating process for the application of a defined construction material layer of the at least one consolidatable construction material to a construction plane, in which selective consolidation of the consolidatable construction material takes place, or to a construction material layer previously applied in the context of carrying out a previous coating process. A construction material layer previously applied in the context of carrying out a previous coating process can thus likewise be referred to or regarded as a construction plane since a consolidation of a consolidatable construction material takes place in an equally selective manner in said plane.

A corresponding coating unit typically comprises one or more coater elements, that is to say, for example, coater blades, which are moved across a construction plane to form defined construction material layers. Accordingly, a coating unit is typically mounted so as to be movable relative to a construction plane.

The apparatus furthermore comprises at least one detection unit for acquiring layer information describing, at least in one or more sections, the quality, in particular the quality of the surface, of a construction material layer applied by means of the coating unit in the context of carrying out a coating process. The at least one detection unit is designed to acquire corresponding layer information during a coating process carried out by means of the coating unit.

By means of a corresponding detection unit it is thus possible to detect the quality, in particular the quality of the surface, of a construction material layer applied by means of the coating unit even during a coating process carried out by means of the coating unit. For this purpose, the detection unit acquires corresponding layer information, which qualitatively or quantitatively describes, at least in one or more sections, the quality, in particular the quality of the surface, of a construction material layer applied by means of the coating unit in the context of carrying out a coating process.

The quality of construction material layer applied by means of the coating unit relates, in particular, to parameters such as smoothness, layer thickness and, in general terms, the ordering of the construction material layer or the surface thereof.

Already consolidated construction material layers (layer regions) and thus sections of a three-dimensional object to be produced should possibly also be understood as construction material layers that have been applied by means of the coating unit and the quality of which has been detected or is to be detected. Consequently, corresponding layer information can also describe the quality of three-dimensional objects or object surfaces, and therefore detection of the quality of three-dimensional objects or object surfaces is also possible, something that can be expedient, for example, in the production of hybrid components in order to accommodate or generate installation-space-related contours.

In all cases, detection of the quality of corresponding construction material layers can be associated with corresponding coating processes; thus, detection of the quality of corresponding construction material layers can take place simultaneously with the carrying out of corresponding coating processes for the application of defined construction material layers to a construction plane. In this way, nonproductive times can be reduced, and additive construction processes can be accelerated overall. In comparison with the prior art described at the outset, it is not necessary to wait for the completion of a coating process to detect the quality of a respective construction material layer applied in the context of the coating process. Moreover, detecting the quality, in particular the quality of the surface, of corresponding construction material layers does not necessarily require service personnel, and this has a positive effect on process management in terms of production and process engineering and thus also in terms of economics.

Moreover, detection (at an early stage) of impairments, i.e. damage or defects, of a coating unit is furthermore possible by means of the detection unit since these are directly reflected in the construction material layer applied by means of the coating unit and can thus be described by means of corresponding layer information. Typically, impairments of a coating unit can be detected from the fact that a defined distance between the applied construction material layer and the detection unit changes. This change in the distance can have an effect on the layer information and, accordingly, can be reflected in corresponding layer information. In the case of a detection unit designed as or comprising an image acquisition unit, as explained below, corresponding changes in distance can result in changes in resolution, brightness etc.

A corresponding detection unit can, in particular, be designed as or at least comprise an image acquisition unit, in particular a camera unit, for acquiring layer image information describing, at least in one or more sections, the quality, in particular the quality of the surface, of a construction material layer applied by means of the coating unit in the context of carrying out a coating process. Corresponding image acquisition units can be designed as CCD cameras, for example, or can comprise a CCD sensor system or some other optical sensor system. Of course, the focus of corresponding image acquisition or camera units is directed or set to a construction material layer (region) to be detected.

A corresponding image acquisition unit can be equipped with lighting means for the at least temporary illumination or lighting of a construction material layer region to be detected. Especially in the case of a camera unit, corresponding lighting means can be a unit for generating a flash light, for example.

In principle, a corresponding image acquisition unit can be designed to acquire corresponding layer image information in one dimension, i.e. in columns or rows, or in more than one dimension. Thus, an image acquisition unit can be a line scan camera, which is distinguished by a relatively high lateral resolution. In this context, resolutions of 1600 dpi or above are conceivable.

Overall, therefore, an improved apparatus for the additive manufacturing of at least one three-dimensional object is available.

Apart from the functional components of the apparatus which have already been mentioned, the apparatus does, of course, comprises further functional components which are typically required for the implementation of additive construction processes and thus for the additive manufacturing of three-dimensional objects. In general, the term functional components of the apparatus should be taken to mean components or component groups which are associated, typically directly, with an additive construction process. These include, in particular, a housing unit having at least one process chamber, generally a closed volume in which additive construction processes for the production of three-dimensional objects take place, at least one support unit for supporting three-dimensional objects produced or to be produced, wherein the support unit can comprise at least one support element mounted so as to be (vertically) movable, at least one construction material application and/or metering unit for applying and/or metering construction material into the process chamber, and at least one beam deflection unit for the selective deflection of an energy beam generated by the radiation-generating unit onto a particular region within a process chamber of the apparatus. In a corresponding process chamber, there is typically an inert protective gas atmosphere, i.e. the process chamber is typically filled with an inert protective gas, e.g. argon, nitrogen etc., or there is a flow of such a gas through the process chamber.

The above list of corresponding functional components of the apparatus is not exhaustive.

A corresponding detection unit can be mounted so as to be movable relative to a construction plane (to be coated) or to an applied construction material layer. The detection unit can thus be used to track a movement of a coating unit mounted so as to be movable relative to a construction plane (to be coated) or to an applied construction material layer in the context of carrying out a coating process. The path of movement of the detection unit can be similar or identical to the path of movement of the coating unit in the context of a coating process.

As an expedient possibility, because it takes up less space within an apparatus process chamber, a corresponding detection unit can be coupled in terms of motion to a coating unit mounted so as to be movable relative to a construction plane (to be coated) or to an applied construction material layer. This enables the detection unit to be moved at the same time or to be made to track the movement of the coating unit during a movement of the coating unit in the context of carrying out a coating process. Here, the path of movement of the detection unit is typically identical to the path of movement of a coating unit in the context of a coating process.

A corresponding coupling of the movement of a corresponding detection unit with a corresponding coating unit can be achieved by arranging or forming the detection unit at least partially on or in the coating unit. Arranging a detection unit on or in a coating unit typically involves a material and/or nonpositive and/or positive structural connection between the detection unit and the coating unit, the connection possibly being reversible (without damage or without destruction). Formation of a detection unit on or in a coating unit typically comprises structural integration of the detection unit into the coating unit.

Different modes of operation of the beam-generating unit are described below, according to which generation of an energy beam and consolidation, accomplished by means of the energy beam generated, of consolidatable construction material is possible either after the completion of a coating process or even during a coating process. The operation of the at least one beam-generating unit is controlled by means of a control unit assigned to the beam-generating unit. The control unit is designed to generate control information controlling the operation of the at least one beam-generating unit and to communicate said information to the beam-generating unit.

A corresponding radiation-generating unit can be designed in a corresponding manner to generate an energy beam for the consolidation of a consolidatable construction material after the completion of a coating process carried out by means of the coating unit. In this variant, consolidation of the construction material takes place only after the completion of the coating process, that is to say typically also after the acquisition of corresponding layer information. Here, the energy beam can be directable, in particular by means of at least one beam deflection unit, onto a region of an applied construction material layer for which the at least one detection unit has already acquired corresponding layer information. This is expedient inasmuch as particular beam properties of the energy beam can be adapted or set in accordance with the quality, described by the layer information, of the applied construction material layer. Optionally, irradiation of a construction material layer can also be omitted if the quality of the applied construction material layer does not satisfy certain predeterminable or predetermined quality criteria. In this case, user information can be output to a user, indicating to a user a construction material layer that does not satisfy corresponding quality criteria after a coating process has been completed.

As an alternative, a corresponding beam-generating unit can be designed to generate an energy beam for the consolidation of the at least one consolidatable construction material (even) during a coating process carried out by means of the coating unit. In this variant, consolidation of the construction material takes place even during the coating process, that is to say typically during the acquisition of corresponding layer information. This variant allows particular shortening of nonproductive times and a particular acceleration of additive construction processes since coating, acquisition of corresponding layer information and irradiation can be carried out (substantially) simultaneously or at close time intervals. Here, the energy beam can likewise be directable, in particular by means of at least one beam deflection unit, onto a region of a construction material layer which has been applied by means of the coating unit and for which the at least one detection unit has already acquired corresponding layer information. The energy beam can thus be made to track and follow the coating unit. As mentioned above, this is expedient inasmuch as particular beam properties of the energy beam can here be adapted or set in accordance with the quality, described by the layer information, of the applied construction material layer.

Optionally, irradiation of a construction material layer can also be omitted if the quality of the applied construction material layer does not satisfy certain predeterminable or predetermined quality criteria. In this case, user information can be output to a user, indicating to a user a construction material layer that does not satisfy corresponding quality criteria after a coating process has been completed.

However, it is also conceivable for the energy beam or a further energy beam to be directable, in particular by means of at least one beam deflection unit, onto a region of a construction material layer which has been applied by means of the coating unit and for which the at least one detection unit has not yet acquired corresponding layer information. The energy beam or a further energy beam can thus be guided so as to run ahead of the coating unit. An energy beam running ahead of the coating unit and an energy beam trailing the coating unit can differ in their beam properties, in particular the energy density, intensity etc.; e.g. an energy beam running ahead of the coating unit can bring about a consolidation of the construction material to be consolidated, and an energy beam trailing the coating unit can bring about further consolidation of the pre-consolidated construction material.

As mentioned, the apparatus can comprise at least one control unit for controlling the operation of the at least one beam-generating unit. The control unit can be designed to generate control information, which controls the operation of the at least one beam-generating unit, in accordance with acquired layer information. Corresponding control information can comprise irradiation information, which describes regions, to be irradiated by means of the energy beam, of a construction material layer applied by means of the coating unit and to be selectively consolidated, and/or which describes beam properties, in particular energy densities, intensities etc. of an energy beam generated or to be generated. By means of the control unit, it is thus possible to adapt or set certain irradiation regions and/or beam properties of an energy beam in accordance with the quality, described by means of corresponding layer information, of a construction material layer applied by means of the coating unit. As mentioned, irradiation of a construction material layer can also optionally be omitted (in a certain region or regions or locally) if the quality of the applied construction material layer does not satisfy certain predeterminable or predetermined quality criteria (in a certain region or regions or locally).

A corresponding detection unit or detection elements, in particular optical detection elements, associated therewith, such as optical lenses, can be contaminated as a result of the construction process, e.g. by deposits of fine construction material particles and/or particles from fumes. The detection unit can therefore be assigned at least one cleaning unit for removing contaminants resulting from the construction process on at least one detection element, in particular optical detection element, e.g. an optical lens, associated with the at least one detection unit. A corresponding cleaning unit can be designed to allow a fluid cleaning medium to flow onto or along a detection element to be cleaned. A corresponding cleaning medium can be a gas, that is to say, for example, carbon dioxide, nitrogen etc. A gas used as a cleaning medium can likewise also be an inert protective gas, which is allowed to flow into an apparatus process chamber.

If a protective gas of this kind is allowed to flow into or through an apparatus process chamber, the apparatus can comprise at least one deflection unit for deflecting a protective gas stream flowing into a process chamber of the apparatus in at least one deflection direction different from an inflow direction, in particular said deflection unit being mounted so as to be movable relative to a construction plane. In this way, it is possible to generate individual protective gas streams. A corresponding deflection unit can comprise a plurality of deflection elements arranged or formed within a process chamber. Through suitable arrangement and alignment of corresponding deflection elements, it is possible to generate an inert gas flow circulating through a process chamber.

The apparatus can furthermore comprise at least one further detection unit for acquiring melting region information, in particular melting region information describing the dimensions and/or the shape and/or the temperature, of a melted construction material layer region ("melt pool") produced by means of the at least one energy beam, and at least one evaluation unit, assigned to the further detection unit, for evaluating acquired melting region information in respect of a quality of the at least one three-dimensional object to be produced. In this way, additive construction processes can be monitored even better in the form of "melt pool analysis", and the quality of three-dimensional objects to be produced can be better anticipated or precalculated.

The apparatus can furthermore comprise at least one collecting unit for collecting partially consolidated and/or unconsolidated construction material which, as a result of the construction process, separates from a construction material layer to be consolidated and is accelerated in an uncontrolled manner into an apparatus process chamber. In this way, it is possible to prevent impairments of the quality of a construction material layer applied by means of the coating unit due to corresponding construction material which, as a result of the construction process, has been separated from a construction material layer to be consolidated and accelerated in an uncontrolled manner into an apparatus process chamber. A corresponding collecting unit typically has at least one passage opening, e.g. a slot-type passage opening, for the passage of an energy beam. A corresponding collecting unit can likewise be mounted so as to be movable relative to a construction plane.

The invention furthermore relates to a method for the additive manufacturing of at least one three-dimensional object by selective consolidation of layers of at least one consolidatable construction material by means of at least one energy beam generated by at least one radiation-generating unit for generating at least one energy beam for consolidating at least one consolidatable construction material, in particular by using an apparatus as described above. The method is characterized in that layer information describing the quality, in particular the quality of the surface, of a construction material layer, applied in the context of a coating process, is acquired during the coating process carried out by means of a coating unit.

In the context of the method, at least one detection unit mounted so as to be movable relative to a construction plane (to be coated) or to an applied construction material layer can be used. It is also conceivable to use at least one coating unit for carrying out at least one coating process for the application of a defined construction material layer of at least one consolidatable construction material to a construction plane or to a construction material layer, previously applied by means of the coating unit in the context of carrying out a previous coating process, of at least one consolidatable construction material, said coating unit being mounted so as to be movable relative to a construction plane. The at least one detection unit can be coupled to the at least one coating unit in terms of motion.

In the context of the method, it is possible to use at least one detection unit which is designed as or at least comprises an image acquisition unit, in particular a camera unit, for acquiring layer image information describing, at least in one or more sections, the quality, in particular the quality of the surface, of a construction material layer applied by means of the coating unit in the context of carrying out a coating process.

In the context of the method, an energy beam for the consolidation of the at least one consolidatable construction material can be generated after the completion of the detection of corresponding layer information, after the completion of a coating process carried out by means of the coating unit. The energy beam can be directed, in particular by means of at least one beam deflection unit, onto a region of a construction material layer which has been applied by means of the coating unit and for which the at least one detection unit has already acquired corresponding layer information.

As an alternative, an energy beam for the consolidation of the at least one consolidatable construction material can be generated (even) during the detection of corresponding layer information during a coating process carried out by means of the coating unit. The energy beam can be directed, in particular by means of at least one beam deflection unit, onto a region of a construction material layer which has been applied by means of the coating unit and for which the at least one detection unit has already acquired corresponding layer information, or onto a region of a construction material layer which has been applied by means of the coating unit and for which the at least one detection unit has not yet acquired corresponding layer information.

In the context of the method, the operation of the at least one beam-generating unit can be controlled by means of at least one control unit for controlling the operation of the at least one beam-generating unit, wherein the control unit generates control information, which controls the operation of the at least one beam-generating unit, in accordance with acquired layer information.

In the context of the method, contaminants resulting from the construction process on at least one detection element, in particular optical detection element, associated with the at least one detection unit can be removed by means of at least one cleaning unit assigned to the detection unit.

In principle, all the statements in connection with the apparatus apply similarly to the method and vice versa.

Figure 2:
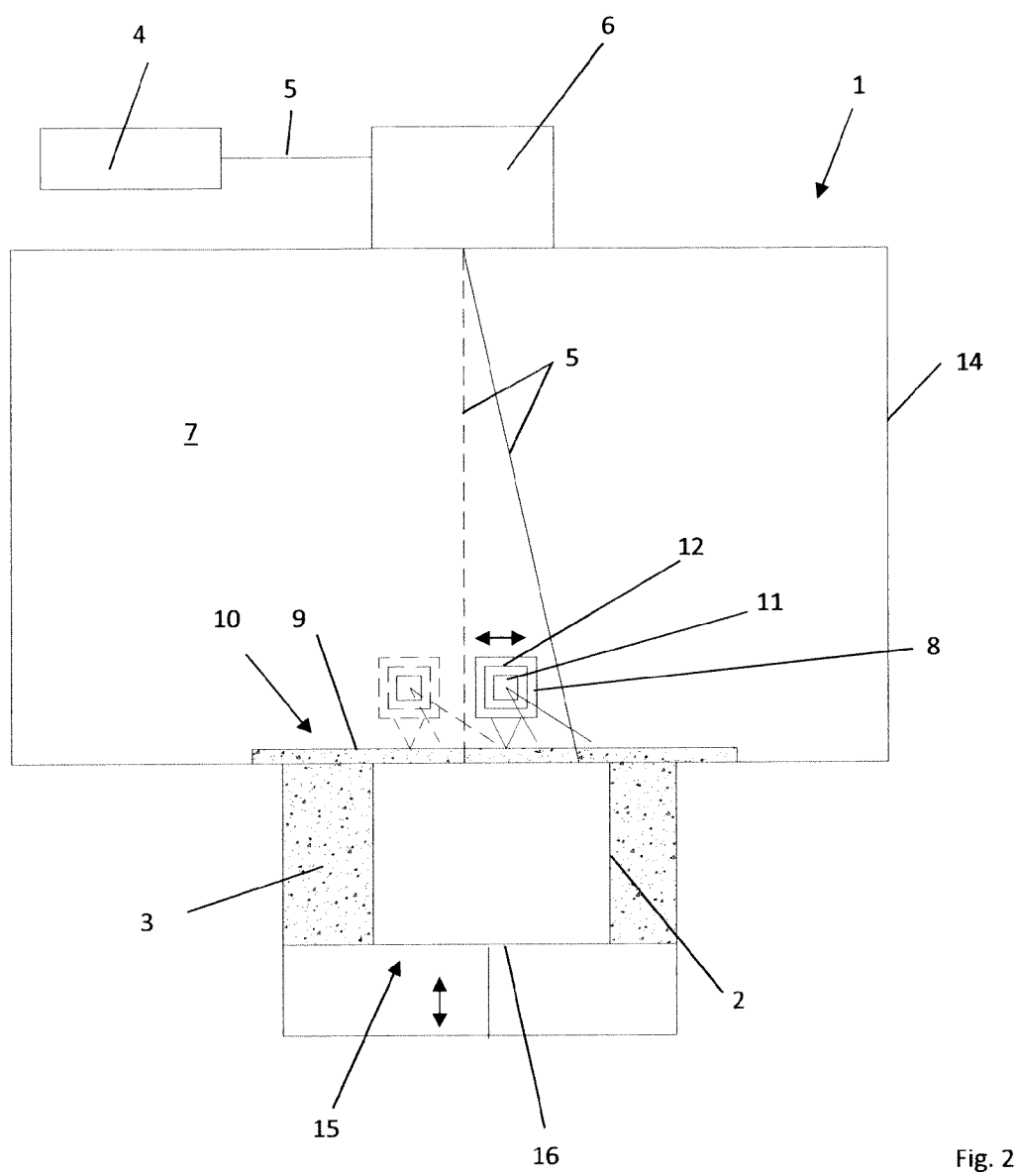
Figure 3:
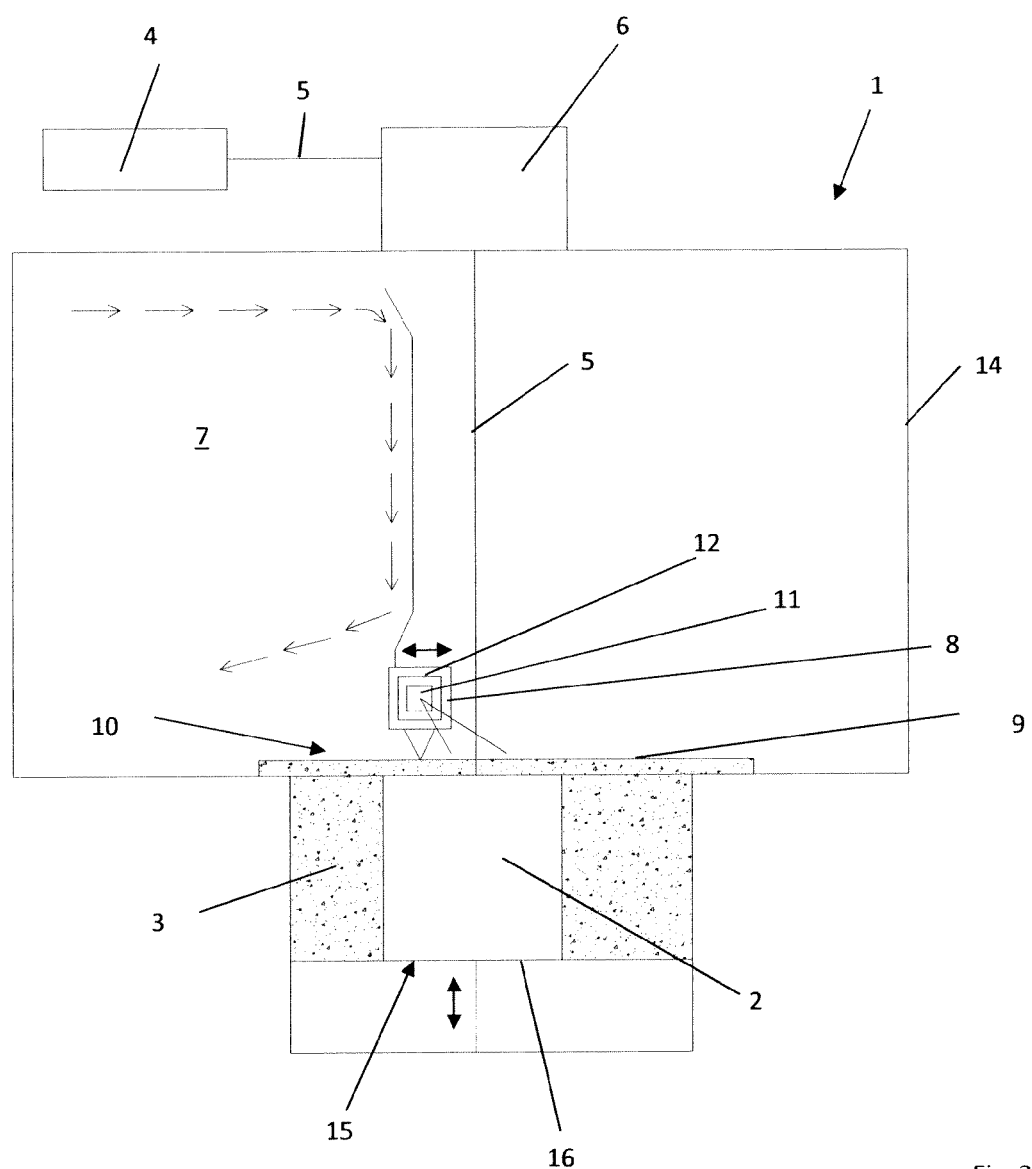

The invention is explained in greater detail by means of illustrative embodiments in the figures of the drawing. In the drawing:

FIGS. 1-3 each show a diagrammatic illustration of an apparatus according to one illustrative embodiment of the invention.

FIG. 1 shows a diagrammatic illustration of an apparatus 1 according to one illustrative embodiment of the invention. The apparatus 1 is used for the additive manufacturing of three-dimensional objects 2 by selective consolidation of layers of a consolidatable construction material 3, namely a metal or plastics powder, by means of an energy beam 5, namely a laser beam, generated by a radiation-generating unit 4, namely a laser-generating apparatus.

The apparatus 1 can be designed as a selective laser sintering apparatus, or SLS apparatus for short, for carrying out selective laser sintering processes, or as a selective laser melting apparatus, or SLM apparatus for short, for carrying out selective laser melting processes.

The radiation-generating unit 4 is assigned a beam deflection unit 6 for the selective deflection of the energy beam 5 generated by the radiation-generating unit 4 onto a construction plane 10 within a process chamber 7 of the apparatus 1. For the selective deflection of the energy beam 5, the beam deflection unit 6 comprises a number of suitable beam deflection elements (not shown), such as deflection or deviation mirrors. Since the radiation-generating unit 4 is a laser-generating unit, the beam deflection unit 6 can be referred to or regarded as a laser scanner, or scanner for short. The beam deflection unit 6 is arranged in the beam path of the energy beam 5 generated by the radiation-generating unit 4.

The apparatus 1 comprises a coating unit 8 for carrying out coating processes for the application of a defined construction material layer 9 of the consolidatable construction material 3 to a construction plane 10, in which selective consolidation of the consolidatable construction material 3 takes place, or to a construction material layer 9 previously applied in the context of carrying out a previous coating process. A construction material layer 9 previously applied in the context of carrying out a previous coating process can likewise be referred to or regarded as a construction plane 10 since selective consolidation of the consolidatable construction material 3 likewise takes place in said plane.

As indicated by the horizontally aligned double arrow, the coating unit 8 is mounted so as to be movable relative to the construction plane 10 and comprises one or more coater elements (not denoted specifically), that is to say, for example, coater blades.

The apparatus 1 furthermore comprises a detection unit 11 for acquiring layer information which qualitatively or quantitatively describes, at least in one or more sections, the quality, in particular the quality of the surface, of a construction material layer 9 applied by means of the coating unit 8 in the context of carrying out a coating process. The detection unit 11 is designed to acquire corresponding layer information during a coating process carried out by means of the coating unit 8.

The detection unit 11 is arranged on or in the coating unit 8. By virtue of the fact that the detection unit 11 is arranged on or in the coating unit 8, the path of movement of the detection unit 11 is identical with the path of movement of the coating unit 8 in the context of a coating process.

The detection unit 11 is an image acquisition unit, in particular a camera unit, for acquiring layer image information describing, at least in one or more sections, the quality, in particular the quality of the surface, of a construction material layer 9 applied by means of the coating unit 8 in the context of carrying out a coating process. The image acquisition unit is a line scan camera, which is distinguished by a relatively high lateral resolution. The image acquisition unit is thus designed to acquire corresponding layer image information in one dimension, i.e. in columns or rows. Of course, the focus of the image acquisition unit is directed or set to a construction material layer (region) to be detected. The image acquisition unit is expediently equipped with lighting means, that is to say, for example, a unit for generating a flash light, for the at least temporary illumination or lighting of a construction material layer region to be detected.

By means of the detection unit 11, it is possible to detect the quality, in particular the quality of the surface, of a construction material layer 9 applied by means of the coating unit 8 even during a coating process. The quality of a construction material layer 9 applied by means of the coating unit 8 relates, in particular, to parameters such as smoothness, layer thickness and, in general terms, the ordering of the construction material layer 9, in particular of the surface thereof.

Already consolidated construction material layers (layer regions) and thus sections of the three-dimensional object 2 to be produced should possibly also be understood as construction material layers 9 that have been applied by means of the coating unit 8 and the quality of which has been detected or is to be detected. Consequently, corresponding layer information can also describe the quality of three-dimensional objects 2 or object surfaces, and therefore detection of the quality of three-dimensional objects or object surfaces is also possible.

In all cases, detection of the quality of corresponding construction material layers 9 can be associated with corresponding coating processes or can take place simultaneously with the carrying out of corresponding coating processes for the application of defined construction material layers to a construction plane 10. In this way, nonproductive times can be reduced, and additive construction processes can be accelerated overall.

Moreover, detection (at an early stage) of impairments, i.e. damage or defects, of the coating unit 8 is furthermore possible by means of the detection unit 11 since these are directly reflected in the construction material layer 9 applied by means of the coating unit 8 and can thus be described by means of corresponding layer information. Typically, impairments of a coating unit 8 can be detected from the fact that a defined distance between the applied construction material layer 9 and the detection unit 11 changes. This change in the distance can have an effect on the layer information because of changes in focus of the detection unit 11, for example, and, accordingly, can be reflected in corresponding layer information. In the case of the detection unit 11 designed as an image acquisition unit in the illustrative embodiments shown in the figures, corresponding changes in distance can result in changes in resolution, focus, brightness etc.

The operation of the beam-generating unit 4 is controlled by means of a control unit (not shown) assigned to the beam-generating unit 4. The control unit is designed to generate control information controlling the operation of the beam-generating unit 4 and to communicate said information to the beam-generating unit 4. Corresponding control information can comprise irradiation information, which describes regions, to be irradiated by means of the energy beam 5, of a construction material layer 9 applied by means of the coating unit 8 and to be selectively consolidated, and/or which describes beam properties, in particular energy densities, intensities etc. of an energy beam 5 generated or to be generated. By means of the control unit, it is thus possible to adapt or set certain irradiation regions and/or beam properties of an energy beam 5 in accordance with the quality, described by means of corresponding layer information, of a construction material layer 9 applied by means of the coating unit 8.

In the illustrative example shown in FIG. 1, the radiation-generating unit 4 can be operated in such a way that an energy beam 5 is generated after the completion of a coating process carried out by means of the coating unit 8 (cf. FIG. 1). In this variant, consolidation of the construction material 3 takes place only after the completion of the coating process, that is to say typically also after the acquisition of corresponding layer information. Here, the energy beam 5 is directed by means of the beam deflection unit 6 onto a region of a construction material layer 9 which has been applied by means of the coating unit 8 and for which the one detection unit 11 has already acquired corresponding layer information. This is expedient inasmuch as particular beam properties of the energy beam 5 can be adapted or set in accordance with the quality, described by the layer information, of the applied construction material layer 9.

Optionally, irradiation of a construction material layer 9 can also be omitted if the quality of the applied construction material layer 9 does not satisfy certain predeterminable or predetermined quality criteria. In this case, user information can be output to a user by means of a control unit, indicating to a user a construction material layer 9 that does not satisfy corresponding quality criteria after a coating process has been completed.

In the illustrative example shown in FIG. 2, the beam-generating unit 4 can be operated in such a way that an energy beam 5 is generated (even) during a coating process carried out by means of the coating unit 8. In this variant, consolidation of the construction material 3 takes place even during the coating process, that is to say typically during the acquisition of corresponding layer information. This variant allows particular shortening of nonproductive times and a particular acceleration of additive construction processes since coating, acquisition of corresponding layer information and irradiation can be carried out (substantially) simultaneously or at close time intervals. Here, the energy beam 5 is likewise directed by means of the beam deflection unit 6 onto a region of a construction material layer 9 which has been applied by means of the coating unit 8 and for which the detection unit 11 has already acquired corresponding layer information. Thus, the energy beam 5 is made to track and follow the coating unit 8 (cf. dashed illustration). This is expedient inasmuch as particular beam properties of the energy beam 5 can be adapted or set in accordance with the quality, described by the layer information, of the applied construction material layer 8.

Optionally, irradiation of a construction material layer 9 can also be omitted in this illustrative embodiment too if the quality of the applied construction material layer 9 does not satisfy certain predeterminable or predetermined quality criteria. In this case, user information can be output to a user in this illustrative embodiment too, indicating to a user a construction material layer 9 that does not satisfy corresponding quality criteria after a coating process has been completed.

However, it is also conceivable for the energy beam 5 or a further energy beam 5 to be directed by means of the beam deflection unit 6 onto a region of a construction material layer 9 which has been applied by means of the coating unit 8 and for which the at least one detection unit 11 has not yet acquired corresponding layer information. The energy beam 5 or a further energy beam 5 can thus be guided so as to run ahead of the coating unit 8.

The illustrative embodiment shown in FIG. 3 shows that, if a protective gas indicated by the arrows is allowed to flow into or through the process chamber 7, the apparatus 1 can additionally comprise a deflection unit 13 for deflecting the protective gas stream flowing into the process chamber 7 in at least one deflection direction different from an inflow direction, in particular said deflection unit being mounted so as to be movable relative to the construction plane 10. The deflection unit 13 is arranged on the coating unit 8. Here, the deflection unit 13 comprises a plurality of interconnected deflection elements, by means of which a protective gas flow circulating in a circulatory manner through the process chamber 7 can be generated.

In the illustrative embodiments shown in the figures, a cleaning unit 12 for removing contaminants resulting from the construction process from detection elements, in particular optical detection elements, e.g. an optical lens, associated with the detection unit 11, is shown. The cleaning unit 12 is designed to allow a fluid cleaning medium, that is to say, for example, or a gas, to flow onto or along at least one detection element to be cleaned.

Apart from the functional components of the apparatus 1 which have already been mentioned, the apparatus 1 does, of course, comprise further functional components which are required for the implementation of additive construction processes and thus for the additive manufacturing of three-dimensional objects 2. These include, in particular, a housing unit 14 having the process chamber 7, a support unit 15 for supporting three-dimensional objects 2 produced or to be produced, wherein the support unit 15 comprises a support element 16 mounted so as to be (vertically) movable, as indicated by the vertically aligned double arrow, a construction material application and/or metering unit (not shown) for applying and/or metering construction material 3 into the process chamber 7.

Even if not shown in the figures, the apparatus 1 can furthermore comprise a further detection unit for acquiring melting region information, in particular melting region information describing the dimensions and/or the shape and/or the temperature, of a melted construction material layer region ("melt pool") produced by means of the at least one energy beam 5, and at least one evaluation unit, assigned to the further detection unit, for evaluating acquired melting region information in respect of a quality of the at least one three-dimensional object 2 to be produced. In this way, additive construction processes can be monitored even better in the form of melt pool analysis, and the quality of three-dimensional objects 2 to be produced can be better anticipated or precalculated.

The apparatus 1 can furthermore comprise a collecting unit (not shown) for collecting partially consolidated and/or unconsolidated construction material 3 which, as a result of the construction process, separates from a construction material layer 9 to be consolidated and is accelerated in an uncontrolled manner into the process chamber 7. A corresponding collecting unit typically has a passage opening, e.g. a slot-type passage opening, for the passage of the energy beam 5. A corresponding collecting unit can likewise be mounted so as to be movable relative to the construction plane 10.

By means of the apparatus 1 shown in the figures, it is possible to implement a method for the additive manufacturing of three-dimensional objects 2 by selective consolidation of layers of a consolidatable construction material 3 by means of an energy beam 5 generated by a radiation-generating unit 4 for generating an energy beam 5 for consolidating a consolidatable construction material 3. The method is characterized in that layer information describing the quality, in particular the quality of the surface, of a construction material layer 9, applied in the context of a coating process, is acquired during the coating process carried out by means of a coating unit 8.

LIST OF REFERENCE SIGNS 1 apparatus
2 object
3 construction material
4 beam-generating unit
5 energy beam
6 beam deflection unit
7 process chamber
8 coating unit
9 construction material layer
10 construction plane
11 detection unit
12 cleaning unit
13 deflection unit
14 housing unit
15 support unit
16 support element

The invention claimed is:

1. A method of additively manufacturing a three-dimensional object, the method comprising:
  performing, with a coating unit comprising one or more coating elements, a coating process comprising moving across a construction plane within a process chamber while applying sequential layers of a metal powdered construction material to the construction plane;
  during the coating process while applying a respective one of the sequential layers of the metal powdered construction material:
    detecting, with a detection unit, layer information describing a quality characteristic of the respective one of the sequential layers of the metal powdered construction material, the detection unit being mounted to or structurally integrated into the coating unit such that the detection unit moves with the coating unit relative to the construction plane, and the detection unit comprising an image acquisition unit configured and positioned to detect and acquire the layer information, wherein the quality characteristic comprises smoothness; and directing, with a radiation-generating unit, an energy beam onto the respective one of the sequential layers of the metal powdered construction material that the detection unit has already acquired the layer information; and controlling, with a control unit, one or more properties of the energy beam based at least in part on the layer information.

2. The method of claim 1, wherein the quality characteristic further comprises thickness and/or defects.

3. The method of claim 1, comprising:
detecting the layer information in one or more dimensions.

4. The method of claim 1, wherein the radiation-generating unit is configured to cause the energy beam to track and/or follow the coating unit.

5. The method of claim 4, comprising:
directing the energy beam, with a beam deflection unit, onto a region of a respective one of the sequential layers of the metal powdered construction material during the coating process for the respective one of the sequential layers, the region comprising an area for which the coating unit has already performed the coating process for the respective one of the sequential layers.

6. The method of claim 5, wherein the region of the respective one of the sequential layers of construction material comprises an area for which the detection unit has already detected the layer information for the respective one of the sequential layers.

7. The method of claim 1, wherein the image acquisition unit comprises a line scan camera with a focus directed towards the sequential layers of construction material on the construction plane.

8. The method of claim 1, further comprising detecting, with the detection unit, damage or defects of the coating unit.

9. A method of additively manufacturing a three-dimensional object, the method comprising:

performing, with a coating unit comprising one or more coating elements, a coating process comprising moving across a construction plane within a process chamber while applying sequential layers of a metal powdered construction material to the construction plane;

during the coating process while applying a respective one of the sequential layers of the metal powdered construction material:

detecting, with a detection unit, damage or defects of the coating unit, the detection unit being mounted to or structurally integrated into the coating unit such that the detection unit moves across the construction plane with the coating unit, the detection unit comprising an image acquisition unit configured and positioned to detect and acquire layer information, wherein the detecting of the damage or the defects of the coating unit is based at least in part on the detected layer information; and directing, with a radiation-generating unit, an energy beam onto the respective one of the sequential layers of the metal powdered construction material that the detection unit has already acquired the layer information.

10. The method of claim 9 further comprising controlling, with a control unit, one or more properties of the energy beam based at least in part on the damage or defects of the coating unit.

11. The method of claim 9, wherein the detected layer information is in one or more dimensions.

12. The method of claim 11, further comprising detecting, with the detection unit, layer information describing a quality characteristic of respective ones of the sequential layers of the metal powdered construction material.

13. The method of claim 12, wherein the image acquisition unit comprises a line scan camera.

14. The method of claim 9, wherein impairments of the coating unit are detectable by changes in a defined distance between the detection unit and the applied sequential layers of the metal powdered construction material on the construction plane.

* * * * *